(12) United States Patent
Goto (10) Patent No.: US 6,349,730 B1
(45) Date of Patent: Feb. 26, 2002

(54) FOOD WASHING APPARATUS (75) Inventor: Fumihiro Goto, Kawasaki (JP)

(73) Assignee: Ryubi Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/387,976

(22) Filed: Sep. 1, 1999

(30) Foreign Application Priority Data

| Sep. 3, 1998 | (JP) | 10-249470 |
| Dec. 21, 1998 | (JP) | 10-362256 |

(51) Int. Cl.[7] .............................. B08B 3/02
(52) U.S. Cl. ............... 134/104.4; 134/111; 134/128; 134/131
(58) Field of Search ............... 134/25.3, 68, 72, 134/104.4, 104.2, 111, 126, 127, 128, 131; 15/3.14, 3.15

(56) References Cited

U.S. PATENT DOCUMENTS

| 1,452,844 A | * | 4/1923 | Ogburn | 134/104.1 |
| 1,617,096 A | * | 2/1927 | Bell et al. | 134/131 X |
| 4,709,713 A | * | 12/1987 | Kuhl | 134/72 |
| 5,176,073 A | * | 1/1993 | Dressel | 134/104.1 X |
| 5,979,473 A | * | 11/1999 | Tate et al. | 15/3.14 X |

FOREIGN PATENT DOCUMENTS

| JP | 5-084058 | 4/1993 | A23N/12/02 |
| JP | 8-322532 | 12/1996 | A23N/12/02 |
| JP | 10-117947 | 5/1998 | A47J/43/24 |

* cited by examiner

Primary Examiner—Philip Coe
(74) Attorney, Agent, or Firm—Pearne & Gordon LLP (57) ABSTRACT

A food washing apparatus comprising a means for generating a sheet-like water jet stream that impinges against foods such as marine products including edible jellyfish, seaweed, shucked or shell-covered shellfish and the like, farm products including vegetables, fruits, and the like by conveying the foods through a water jet stream distribution area or food wash area. A plurality of sheet-like water jet stream layers are generated at a predetermined angle from various directions and impinge against the food surfaces so as to wash them and remove foreign matter such as insects, mud, pebbles, fish scales, etc. from the foods.

9 Claims, 9 Drawing Sheets

FOOD WASHING APPARATUS

TECHNICAL FIELD OF THE INVENTION

This invention pertains to an apparatus for washing foods and more particularly to an apparatus for washing foods to remove foreign matter such as insects, mud, pebbles, fish scales the like from said foods.

BACKGROUND OF THE INVENTION

Various foods such as marine products including edible jellyfish, seaweed, shucked or shell-covered shellfish and the like, as well as farm products including vegetables and fruits tend to be contaminated with foreign matter such as insects, mud, pebbles, sand, straw pieces, hairs, fish scales, etc. after they are collected and before they are cooked.

For example, the edible jellyfish generally used for Chinese style dishes are commercially available preserved with salt. Such edible jellyfish as preserved with salt are washed in water to remove the salt and then heated for a short time before they are cooked. The jellyfish are cut into many strips and combined with other foods while being dressed. There is a high demand for edible jellyfish because of their unique flavor and low caloric content.

Edible jellyfish generally are treated with salt once collected to preserve them during transport. Before the jellyfish are processed and/or packed, they are washed or cleaned with salt water and then cut into pieces of predetermined size.

Marine products other than jellyfish, such as seaweed or shellfish, may be treated in a similar manner jellyfish.

Furthermore, farm products such as vegetables and fruits are packed in cases once they are collected for storage or transportation. Such farm products must be washed with water before cooking.

Any foreign matter such as insects, mud, pebbles, sand, straw pieces, hairs, fish scales, etc. must be removed before they are cooked or eaten. Two Japanese patents of the prior art (JP8-322532 and JP10-117947) disclose a means by which food contaminated in the above manner is washed in a cage that is immersed into a water tank. In another prior art patent (JP5-84058), contaminated foods are washed by immersion in a water tank by means of a conveyor. In a further prior art patent, foods such as soybeans are treated by an apparatus whereby the foods (soybeans) are conveyed by a conveying means through a water tank into which steam is jetted so as to generate bubbles.

However, the apparatuses of the prior art cannot effectively remove foreign matter such as insects, mud, pebbles, sand, straw pieces, hairs, fish scales, etc. from the foods because neither flowing water nor immersion combined with agitation can effectively remove such contaminants. Furthermore, subsequent food batches are not washed with fresh water because the same wash water remains within the water tank through which the food is conveyed. The water thus becomes more contaminated with foreign matter with each sequential batch of food that is washed.

SUMMARY OF THE INVENTION

Accordingly, it is a principal object of the present invention to provide an apparatus for washing foods to remove foreign matter such as insects, mud, pebbles, sand, straw pieces, hairs, fish scales, and the like which may be attached thereto or which the foods may have as parts thereof.

It is another object of the present invention to provide an apparatus for washing foods using a continuous fresh supply of water free from contaminants that may have been removed from prior batches of washed foods.

In accordance with an object of the present invention, there is provided an apparatus for washing foods, the apparatus comprising a food conveyor means to convey the foods through a food wash area; and a water jet stream generator means to generate a sheet-like water jet stream and direct it to the food wash area so that the sheet-like water jet stream impinges against the foods whereby the foods are washed to remove foreign matter.

The water jet stream generator means preferably generates a plurality of sheet-like water jet stream layers that impinge against the foods at a predetermined angle relative to a conveying surface of the food conveying means and/or from various directions relative to a conveying direction of the food conveyor means.

The sheet-like water jet stream impinges the foods over the entire surface thereof while said foods are conveyed by the food conveyor means.

Planar foods such as edible jellyfish, shucked shellfish, and the like may be conveyed while being held between upper and lower conveying members such as net-like conveyor members through which water is allowed to flow, and at least one pair of opposing sheet-like water jet stream layers impinges against the opposite surface of the foods from opposite directions such that the opposing sheet-like water jet stream layers are jetted in a plane. The water jet stream layers may be directed to the surfaces of the foods at either a lateral or oblique predetermined angle relative to the horizontal faces of the conveying members so that said jet stream layers traverse the conveying members in a widthwise direction or in an oblique direction.

In case the foods to be washed are foods other than marine products, such as vegetables, fruits, or the like, such foods are also conveyed while being mounted on a conveying member such as a net-like conveyor member through which water is allowed to flow and a plurality of sheet-like water jet stream layers are impinged against the surfaces of the foods. The jet stream layers may be directed upwardly or downwardly toward the surfaces of the foods in a manner parallel and inclined relative to the horizontal faces of the conveying member or in a manner lateral thereto in a widthwise direction.

The sheet-like water jet stream of the present invention serves to efficiently removed foreign matter such as insects, mud, pebbles, sand, straw pieces, hairs, fish scales and the like from foods in a crumpled configuration by effectively scattering such contaminants from the foods.

The water jet stream generator means may comprise a water pump and at least one water jet stream generator which may have either a plurality of slit type nozzles or a single elongated slit type nozzle.

A water circulation means may be provided which serves to circulate water so that it supplies the water to the water jet stream generator means, receives the water from the food wash area and returns it to the water jet stream generator means.

The water circulation means may comprise a water supply tank to supply the water to the water jet stream generator means, a water receiver tank to receive the water from the food wash area and a water return passage including a pump and a filter to transfer the water within the water receiver tank to the water supply tank while filtering the recirculated water so as to purify it. The water supply tank may supplementally receive additional water from a fresh water supply source such as water service.

A water collector means may be provided to receive and collect the water once the water has been used to wash the foods, and to direct said used water into the water receiver tank. The water collector means may have an interruption member or members which are disposed between a conveying area of the food conveyor means and the return area thereof. The interruption member or members serve to purge the conveyor means of any foreign matter that may have been removed from foods and deposited onto said conveyor means. In this manner, succeeding foods can be conveyed on the food conveyor means free of contact with latent contaminants removed from prior foods and deposited onto the conveying means.

BRIEF DESCRIPTION OF THE DRAWING

The above and other objects and features of the invention will be apparent from the description of the embodiments of the invention with reference to the accompanying drawings in which.

DETAILED DESCRIPTION OF EMBODIMENTS OF THE INVENTION

Figure 1:
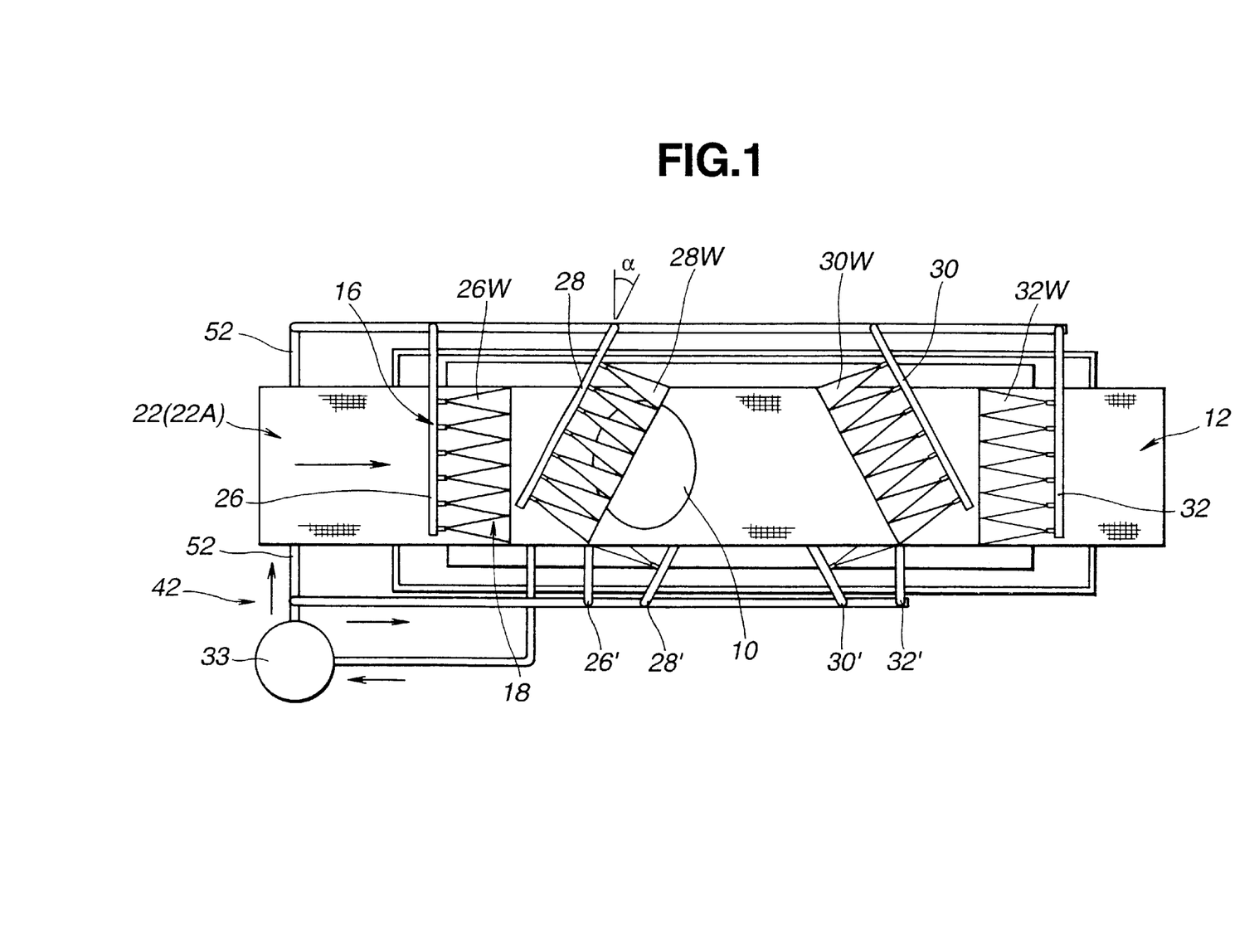
FIG. 1 is a plan view of an apparatus for washing foods in accordance with one embodiment of the present invention having an upper conveyor member and a hood shown to be omitted therefrom for good understanding thereof wherein planar seafoods such as edible jellyfish are suitably washed.
Figure 2:
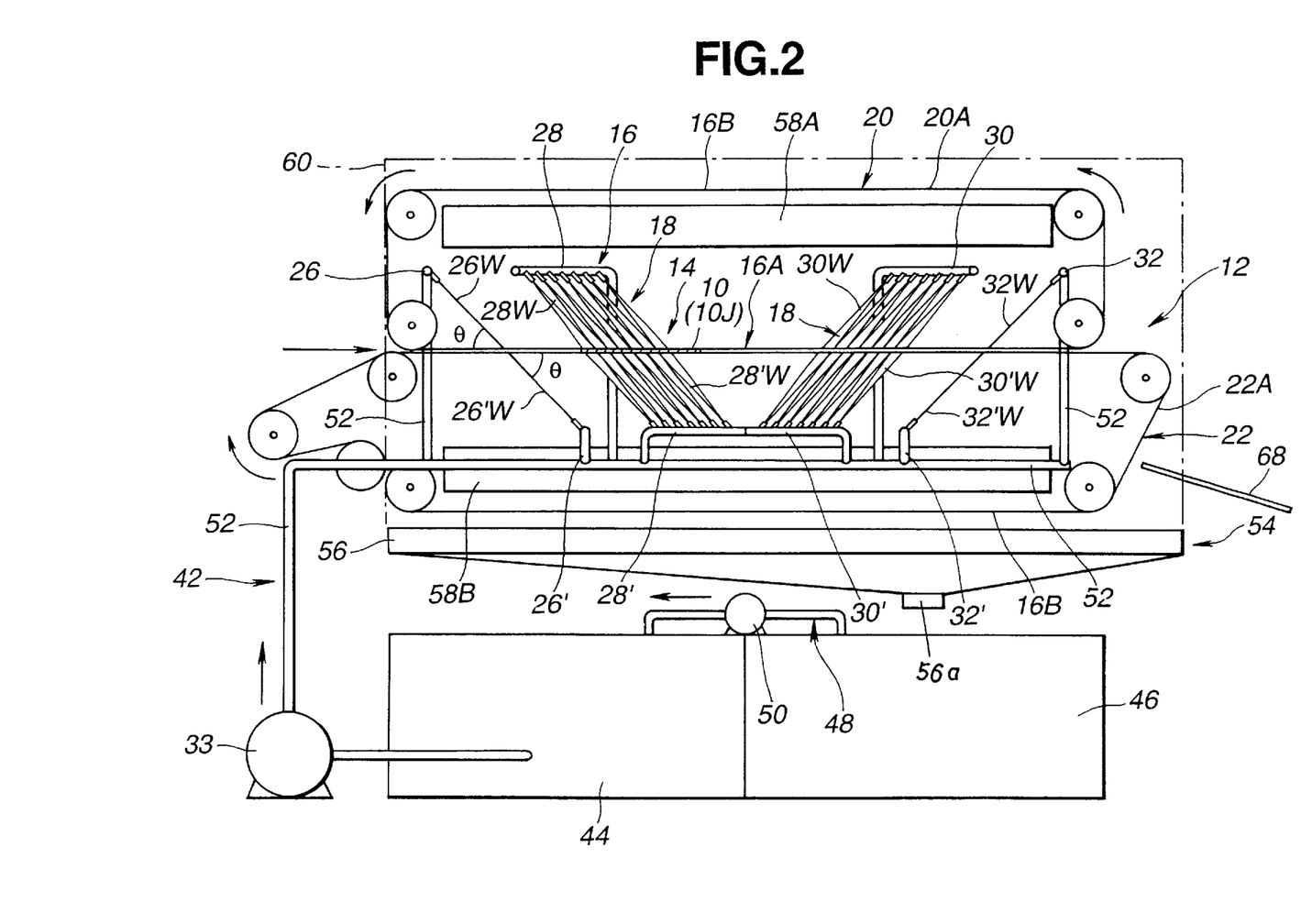
FIG. 2 is a side elevational view of the apparatus of FIG. 1 with the upper conveyor member and the hood shown therein.
Figure 3:
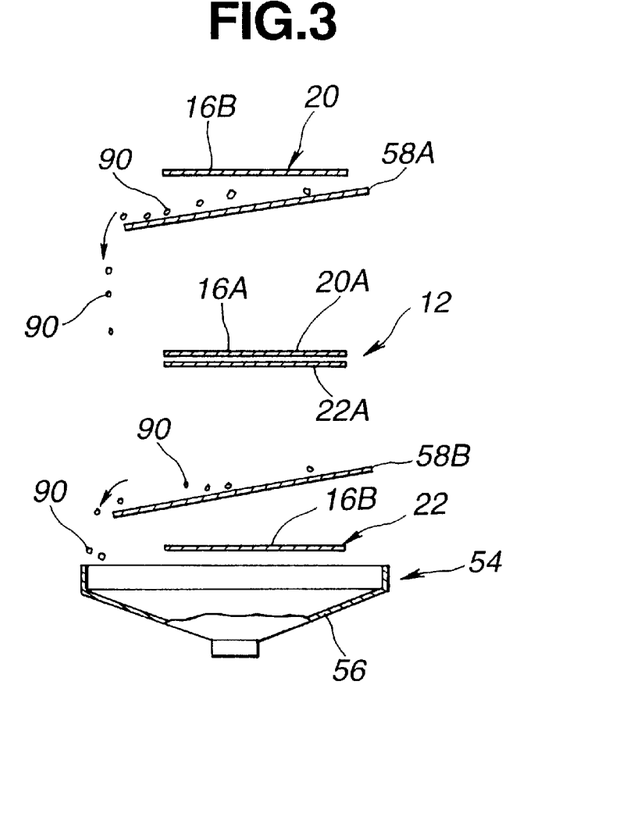
FIG. 3 is a cross-sectional view of the apparatus of FIG. 1 with conveyor members, interruption members and a water collector shown therein for illustration of a water collector means used therein.

Now referring to FIGS. 1 through 3, there is illustrated an apparatus for washing foods in accordance with one embodiment of the present invention wherein planar seafoods such as edible jellyfish are suitably washed. In FIGS. 1 through 3, although the foods are generally designated by a reference numeral 10, the jellyfish are designated by a reference numeral 10J. In the case of washing jellyfish 10J, salt water should be used.

The apparatus for washing foods comprises a food conveyor means 12 to convey the foods 10 through a food wash area 14 and a water jet stream generator means 16 to generate a sheet-like water jet stream which is generally designated by a reference numeral 18 in FIGS. 1 and 2. The water jet stream 18 is directed to the food wash area 14 so that the sheet-like water jet stream 18 is struck or impinges against the foods 10. The water jet stream generator means 12 may deliver salt water suitable for washing the edible jellyfish 10.

Figure 6A:
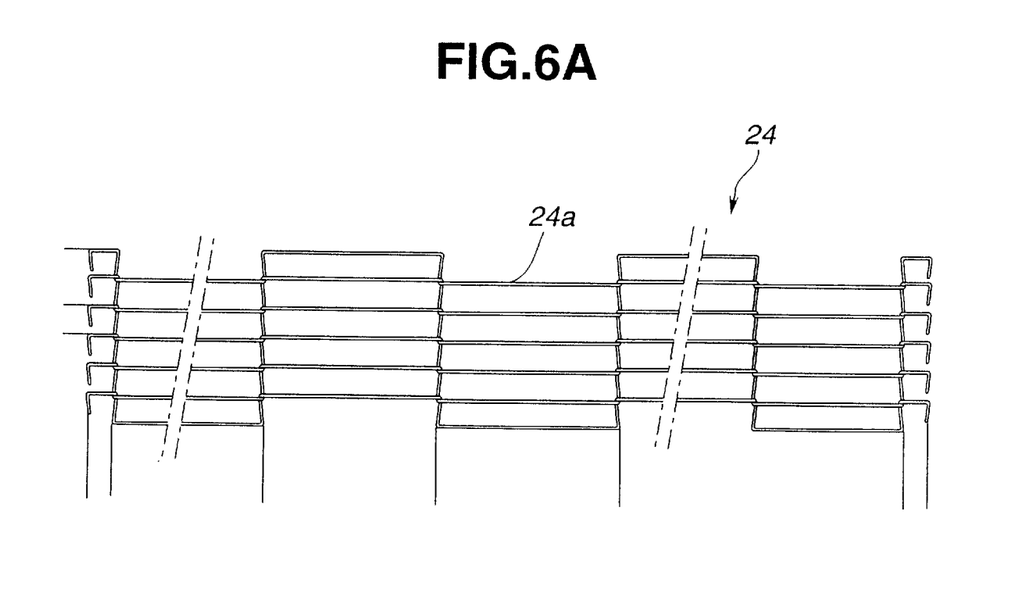
FIG. 6A is an enlarged plan view of a conveying member formed of a net in one form used in the apparatus of FIGS. 1 through 3.
Figure 6B:
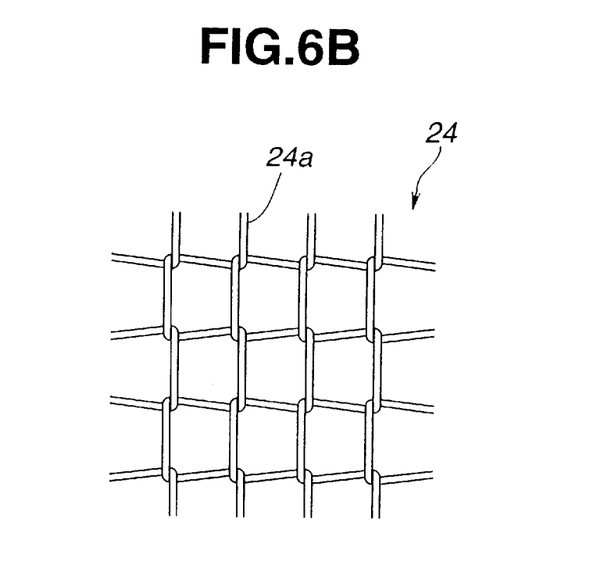
FIG. 6B, is an enlarged plan view of a conveying member formed of a net in another form which may be used in the apparatus of FIGS. 1 through 3.

In the illustrated embodiment, the food conveyor means 12 may comprise upper and lower conveyor members 20 and 22, which may preferably be in the form of endless type conveyor belts 20A and 22A. The foods 10 are conveyed from an inlet of the apparatus toward an outlet thereof as indicated by an arrow shown in FIGS. 1 and 2 while the foods 10 are held between the upper and lower conveyor belts 20A and 22A. The endless type conveyor belts 20A and 22A are formed of water-permeable material and preferably as net-like conveyor belt 24 through which water is allowed to flow 1 as shown in FIGS. 6A and 6B. The net-like conveyor belt 24 may be formed of knitted elongated member 24a having a thickness of 2 mm or more or less. The elongated member 24a may be formed as a thread from metallic or plastic material, or from corrosion resistant plastic clad metal. The conveyor belts 20A and 22A may be of the type commercially available under the trade name "Yuniko wire belt" from Universal Industrial Co., Ltd., Japan which is formed as shown In FIG. 6A. The upper and lower conveyor members 20 and 22 may have a width of 600 mm and the net may have a mesh distance of 3 mm to 8 mm.

The endless type upper and lower conveyor members 20 and 22 may be successively driven at a constant velocity by a drive power source not shown. Alternatively, the endless type upper and lower conveyor members 20 and 22 may be intermittently driven by the drive power source. Preferably, the distance between the upper and lower conveyor members 20 and 22 may be adjusted for conveying various foods therebetween although a distance adjusting mechanism is not illustrated in FIGS. 1 and 2.

In the illustrated embodiment, the water jet stream generator means 16 may preferably generate the sheet-like water jet stream 18 including a plurality of sheet-like water jet stream layers, which impinge against the surfaces of the foods 10 at a predetermined angle relative to a conveying surface of the food conveyor means 12 and from various directions relative to a conveying direction thereof as described in more detail below.

More particularly, as shown in FIGS. 1 and 2, the water jet stream generator means 16 may comprise four pairs of upper and lower water jet stream generators 26 and 26', 28 and 28', 30 and 30', and 32 and 32', with each respective pair of jet stream generators generating a corresponding pair of opposing water jet stream layers 26W and 26'W, 28W and 28'W, 30W and 30'W and 32W and 32'W.

Figure 4A:
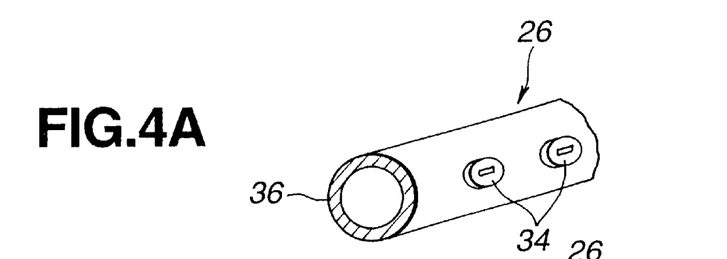
FIG. 4A is in enlarged perspective view of a water jet stream generator used in the apparatus of FIGS. 1 through 3.

As shown in FIG. 4A, these pairs of water jet stream generators 26 and 26' through 32 and 32' comprise a plurality of slit type nozzles 34 which may be commonly provided on a water conduit 36 connected to a water supply tank as described below. The water jet stream generators 26 and 26' through 32 and 32' may be of the type commercially available under the model number "1/8MVNP40124S303 from Ikeuchi Co., Ltd., Japan.

As is apparent from FIG. 1, the pairs of opposing water jet stream layers 26W and 26'W through 32W and 32'W from the respective nozzles 34 are expanded in the form of triangle sheet so that pairs of opposing jet stream layers are directed together onto the foods 10 so as to form the respective sheet-like water jet stream collective layers.

Figure 4B:
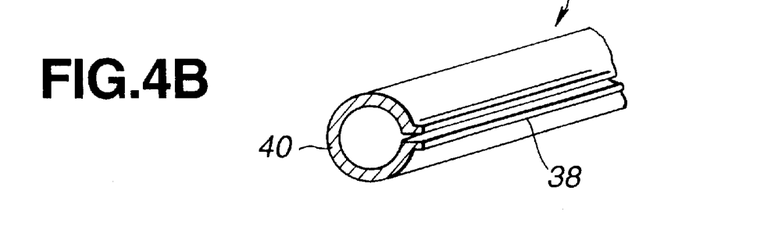
FIG. 4B is an enlarged perspective view of a water jet stream generator in another form which may be used in the apparatus of FIGS. 1 through 3.

Alternatively, as shown in FIG. 4B, the pairs of water jet stream generators 26 and 26' through 32 and 32' may comprise a single elongated slit type nozzle 38 which is provided integrally to a water conduit 40 connected to the water supply tank in the same manner as the water conduit 36 of FIG. 4A. The nozzle 38 can generate the sheet-like water jet stream which extend in a widthwise direction from the nozzle 38 to the food wash area 14.

Figure 5A:
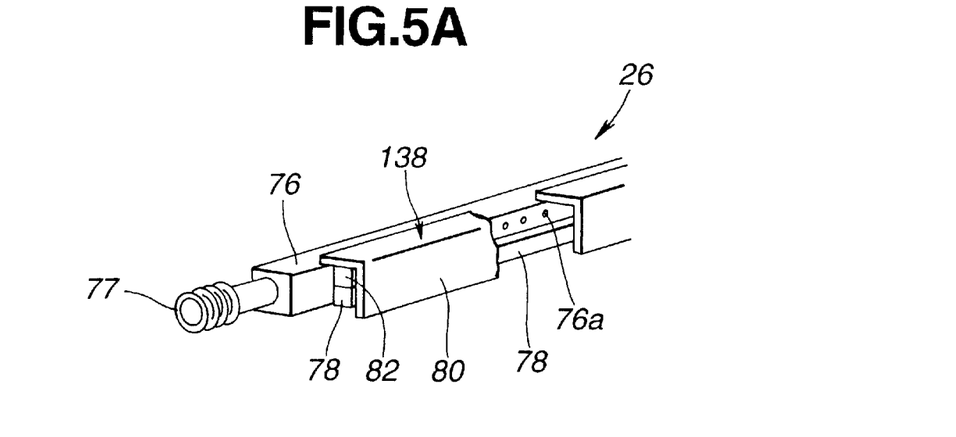
FIG. 5A is a perspective view of a water jet stream generator in further form which may be used in the apparatus of FIGS. 1 through 3.
Figure 5B:
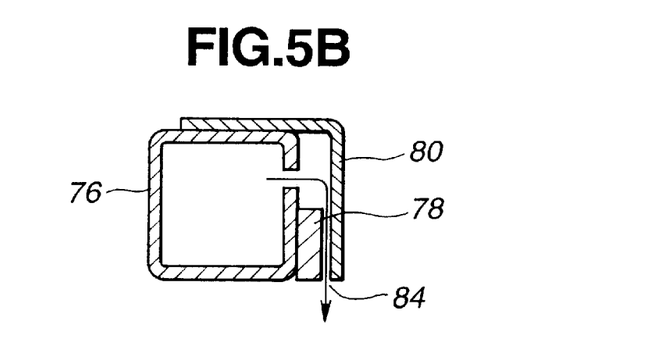
FIG. 5B is an enlarged cross-sectional view of the water jet generator of FIG. 5A.
Figure 5C:
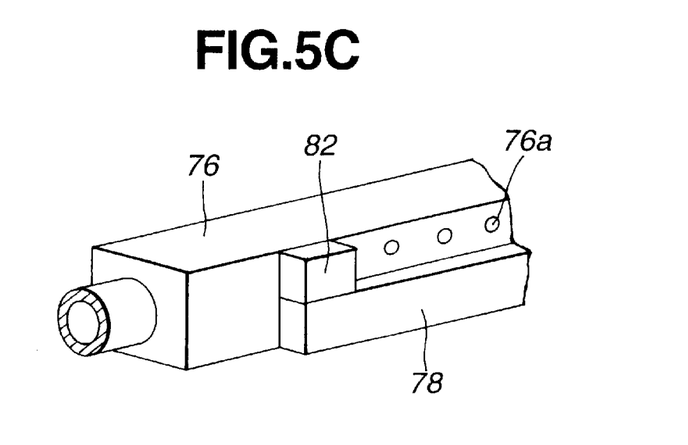
FIG. 5C is an enlarged perspective view of the water jet generator of FIG. 5A, but with a reversely L-shaped slit forming member shown to be omitted therefrom.

Otherwise, as shown in FIGS. 5A through 5C, the pairs of water jet stream generators 26 and 26' through 32 and 32' may comprise a single elongated slit type nozzle 138 which is also provided integrally to a water conduit 76 having a rectangular cross section. A slit 84 may be formed between a first slit forming member 78 of rectangular cross section attached to the one side of the water conduit 76 and a second reverse L-shaped slit forming member 80 attached to an upper side face of the water conduit 76. A stop member 82 serves to close the space above the first slit forming member 78 and between the one side face of the water conduit 76 and the second slit forming member 80. The water jet stream generator of FIGS. 5A through 5C can be more precisely formed because the slit can be easily adjusted by a space between the first and second slit forming members 78 and 80.

The water jet stream generator means 16 may preferably include a high pressure pump 33 to supply water under predetermined pressure from a water supply tank described later through a water conduit also described later. The high pressure pump 33 may be of one commercially available from Grundfos Pump Co., Ltd., Japan under a model number of CRN30-130/12,18.5kW. The particular pump 33 may supply high pressure water of about 30 kg/cm$^2$ or less than, but the pressure under which the water jet stream layers are struck against the foods 10 varies on the foods 10 to be washed. The water jet pressure of 10 to 15 kg/cm$^2$ may be proper for the jellyfish.

The sheet-like water jet stream 18 can more effectively wash the foods 10 than water stream or water jet stream in other forms. More particularly, the effectiveness in washing the foods has a strong relation to quantity and pressure of the water. Higher effectiveness in washing the foods can be provided by a larger quantity of water at a given pressure. Although a larger quantity of water can be obtained by a nozzle port of larger diameter. The nozzle having the slit type port to generate the sheet-like water jet stream 18 as shown in FIGS. 4 and 5 can obtain a larger quantity of water than the conventional nozzles having the circular port.

As shown in FIGS. 1 and 2, the opposing water jet stream layers 26W and 26'W are struck against the opposite surfaces of the foods 10 from opposite directions so that the opposing sheet-like water jet stream layers 26W and 26'W preferably form a common plane. The other pairs of opposing water jet stream layers 28W and 28'W through 32W and 32'W are also struck against the surfaces of the foods 10 in the same manner as the opposing water jet stream layers 26W and 26'W. It will be noted that the opposing water jet stream layers serve to counterbalance forces applied to the opposite surfaces of the jellyfish 10J.

With the counterbalanced forces applied to the opposite surfaces of the jellyfish 10J, the jellyfish can be effectively washed while simultaneously being widely expanded between the upper and lower conveyor members 20 and 22 without sliding between the said upper and lower members 20 and 22. Such a configuration allows the jellyfish 10J to be washed for a longer time than otherwise and over a greater proportion of the surfaces of the jellyfish 10J.

If only one of the upper or lower jet stream layers of the opposing pairs of water jet stream layers 26W and 26'W through 32W and 32'W were used, for example only the upper water jet stream layers 26W through 32W, then the jellyfish 10 would be forced forward by the water jet stream layers 26W and 28W while at the same time being forced rearward the water jet stream layers 30W and 32W even though the jellyfish 10 are held between the upper and lower conveyor members 20 and 22.

With the jellyfish 10J forced in opposite directions by counteracting water jet stream layers as described immediately above, the time during which the jellyfish 10J contact the water jet stream layers will be decreased, and the jellyfish 10J on the conveyor members 20 and 22 will be compressed by the opposing jet streams so as to form wrinkles. This wrinkling effect will reduce the effectiveness of the washing process because the wrinkling of the jellyfish 10J will make foreign matter far more difficult to remove therefrom. Alternatively, the opposing water jet stream layers may be directed so that they are crossed near the jellyfish 10 or offset to each other relative to the conveying direction.

As also shown in FIGS. 1 and 2, the opposing water jet stream layers 26W and 26'W through 32W and 32'W are preferably directed to the surfaces of the foods 10 at various inclination angles θ relative to the horizontal conveying faces of the conveying members 20 and 22. The inclination angles θ of the opposing water jet stream layers 26W and 26'W through 32W and 32'W may range from between 30° and 60°.

It should be noted that since many foods 10, especially jellyfish 10J, have a large number of wrinkles or creases overlapping each other, foreign matter cannot be effectively removed from the crevices formed between such wrinkles or creases where such foreign matter collects if the water jet stream layers are jetted against the jellyfish 10J at a single constant angle. Effectiveness is further reduced if the single constant angle relative to the horizontal conveying faces of the conveyor members 20 and 22 is a right angle.

As is apparent from FIG. 1, the pairs of opposing water jet stream layers 26W and 26'W, and 32W and 32'W traverse the conveyor members 20 and 22 in a widthwise direction while the pairs of opposing water jet stream layers 28W and 28'W, and 30W and 30'W traverse the conveying members 20 and 22 at an angle θ of about 30° relative to the widthwise direction of the conveying members 20 and 22 in an oblique direction. The declination angle θ of the opposing water jet stream layers 28W and 28'W, 30W and 30'W may be an angle other than 30°, though preferably not 90 or 270 relative to the widthwise direction of the conveying members 20 and 22. In other words, the directions from which the sheet-like water jet stream layers 28W and 28'W, 30W and 30'W are directed are preferably not parallel to the conveying direction of the food conveyor means 16.

If the deflection angle a of the water jet stream layers 28W and 28'W, 30W and 30'W is permitted to be 90° or 270° relative to the widthwise direction of the conveying members 20 and 22, then the water jet stream layers would impinge the foods 10 in a direction co-linear with the path of the foods 10 along the food conveyor means 16, thereby drastically reducing the effectiveness of the water jet stream layers in washing the foods 10.

With the opposing water jet stream layers 28W and 28'W, 30W and 30'W directed at a deflection angle α of other than 90° or 270°, preferably approximately 30°, the water jet stream layers 26W and 26'W through 32W and 32'W impinge the surfaces of the foods 10 from various directions as the foods 10 are conveyed through the food wash area 14 so that the foreign matter such as insects, mud, pebbles, sand, straw pieces, hairs, and the like that collect in the wrinkles or creases of the jellyfish 10J are more effectively removed from the foods 10.

Whereas if the water jet stream layers 26W and 26'W through 32W and 32'W impinge the foods from a single direction, much foreign matter would remain within the wrinkles or creases of the jellyfish 10J. The foregoing is particularly true if the water jet streams are in the form of a shower and not in the form of a sheet.

As is apparent in FIGS. 1 and 2, the water jet stream layers 26W, 28W, 30'W and 32'W are directed in a forward direction relative to the conveying direction of the food conveying means while the water jet stream layers 26'W, 28'W, 30W and 32W are directed in a reverse direction relative to the conveying direction. This configuration of water jet streams causes the foods to be washed over their entire surface.

In the illustrated embodiment, the apparatus for washing the foods may further comprise a water circulation means 42 to circulate salt water as washing water and to supply salt water to the water jet stream generator means 16, having received the salt water from the food wash area 14.

The water circulation means 42 may comprise a water supply tank 44 to supply the salt water to the water jet stream generator means 16, a water receiver or receipt tank 46 to receive the water from the food wash area 14 and a water return passage 48 which may preferably include a water pump 50 and a filter not shown to transfer the water within the water receiver tank 46 to the water supply tank 44 while filtering the dirty water through the filter so as to purify it.

The water supply tank 44 may supplementally receive additional salt water while salt is added to water from an appropriate water source such as water service, if necessary. A water conduit 52 shown in FIGS. 1 and 2 serves to supply the salt water from the water supply tank 44 to the water jet stream generator means 16.

In the illustrated embodiment, the apparatus of FIGS. 1 and 2 may further comprise a water collector means 54 which serves to receive and collect the salt water after it has been used to wash the foods 10 and introduce it into the water receiver tank 46 of the water circulation means 42.

The water collector means 54 may comprise a shallow funnel-like collector 56 which is disposed under the food conveyor means 12 so as to collect the water from the food wash area 14. The salt water collected within the collector 56 is introduced through a narrow opening 56a into the water receiver tank 46.

The water collector means 54 may further comprise two interruption members 58A and 58B which are disposed between a conveying area 16A of the food conveyor means 16 (corresponding to the food wash area 14) and the return area 16B thereof.

More particularly, one of the interruption members 58A is disposed between the conveying area 16A and the return area 16B of the upper conveyor belt 20A while the other interruption member 58B is disposed between the conveying area 16A and the return area 16B of the lower conveyor belt 22A.

As noted from FIG. 3, the interruption members 58A and 58B may be inclined in a widthwise direction relative to the conveyor belts 20A and 22A and at their one edge disposed above the collector 56.

Thus, it will be noted that foreign matter 90 attached to the upper conveyor belt 20A is dropped from the return area thereof onto the upper interruption member 58A and thus does not return to the conveying area of the upper conveyor belt 20A while the foreign matter 90 attached to the lower conveyor belt 22A is dropped from the return area thereof onto the lower interruption member 58B and thus does not return to the conveying area of the lower conveyor belt 22A.

The foreign matter 90 received on the interruption members 58A and 58B is carried by water along the inclination of the respective interruption members and dropped on the collector 56 of the water collector means 54 as shown in FIG. 3.

Heavier matter such as sand, pebbles, and the like settle on the bottom of the water receiver tank 46 while lighter matter removed from the water via a filter (not shown) in the water return passage 48 upstream of the water pump 50.

As shown in FIG. 1, a hood 60 indicated by a dotted line in FIG. 1 may be provided to surround the food conveyor means 12 exposing only the inlet and outlet thereof. The hood 60 serves to prevent the removed foreign matter as well as the water from being widely scattered around. The hood 60 may be securely mounted on the upper edge of the collector 56 as shown in FIG. 2.

A chute 68 may be provided under the lower conveying member 22 at the outlet of the apparatus as shown in FIG. 2 so that the washed jellyfish 10J are received from the lower conveying member 68.

Using fresh water as washing water, jellyfish 10J absorb too much water and therefore they tend to become soft, thereby destroying the unique hardness of jellyfish. Using salt water as washing water, such an undesirable effect upon the hardness of Jellyfish 10J can be avoided because the salt water prevents the jellyfish 10J from absorbing too much water due to the osmotic pressure of salt water.

However, if the duration of contact between the washing water and the jellyfish 10J is short, then fresh water may be used. Otherwise, fresh water may be used to wash jellyfish 10J preserved with salt only for a short duration at the beginning of the operation because the salt-concentration of the water will decrease as time lapses and more of the preservation salt is washed away.

In operation, the jellyfish 10J are transferred onto the lower conveyor belt 22A at the inlet of the apparatus and then covered by the upper conveyor belt 20A so as to be held between the upper and lower conveyor belts 20A and 22A toward the food wash area 14 whereby the jellyfish 10J are expanded so as to allow them to be effectively washed. Thus, the jellyfish 10J are prevented by the upper and lower conveyor belts 20A and 20B from being moved relative to the conveyor belts by the high-pressure water jet stream layers.

The jellyfish 10J reach the food wash area 14 where the sheet-like water jet stream layers 26W and 26'W through 32W and 32'W from the water jet stream generators 26 and 26' through 32 and 32' successively impinge the jellyfish 10 from various directions.

Although each pair of opposing sheet-like water jet stream layers 26W and 26'W through 32W and 32'W is directed to the surfaces of the foods linearly aligned, the individual pairs water jet stream layers are directed toward the food 10 from different directions while the foods 10 are moved together with the conveyor belts 20A and 22A so that the water jet stream layers impinge against the entire surface of the foods 10.

Also, it will be noted that since the water jet stream layers are directed toward the foods 10 from various directions while the foods 10 are moved together with the conveyor belts 20A and 22A, the foods 10 become crumpled by the directional sheet-like water jet stream layers 26W and 26'W through 32W and 32'W.

At the same time, the directional sheet-like water jet stream layers 26W and 26'W through 32W and 32'W wash the jellyfish 10J while they pierce into the meat of the jellyfish 10J generally at the angle at which the water jet stream layers are directed to the conveying faces of the conveyor belts 20A and 22A and scatter the foreign matter from the jellyfish 10J.

After the water jet stream layers 26W and 26'W through 32W and 32'W impinge the jellyfish 10J so as to wash them, the washing water carries the removed foreign matter onto the interruption members 58B which deliver the washing water, contaminated with foreign matter, into the collector 56 and ultimately into the water receiver tank 46 where the weighty foreign matter settles to the bottom.

The salt water from which the weighty foreign matter has settled out is transferred by the water pump 50 to the water supply tank 44 through the filter (not shown) where the remaining foreign matter is removed from the salt water.

Thus, it will be noted that the salt water free of foreign matter removed from the preceding foods is delivered from the water supply tank 44. This prevents the water jet stream generator means 16 from being clogged by the foreign matter in the salt water and also enables succeeding foods to be washed by clean salt water.

The washed jellyfish 10J are received through the chute 68 onto a jellyfish container or another separate conveyor, also not shown.

It should be noted that the deflection of the pairs of opposing sheet-like water jet stream layers 28W and 28'W, 30W and 30'W serves to most effectively form the water jet stream layers although the number of nozzles 34 of the water jet stream generators slightly increases.

As shown in FIG. 1, in case that the water jet stream generators 26 and 26' or 32 and 32', which are placed in a direction parallel to the conveying direction, are formed by six slit-type nozzles 34, the deflected water jet stream generators 28 and 28' or 30 and 30' may be formed by seven slit-type nozzles 34, increasing the number of nozzles 34 for each water jet stream generator by one.

After the jellyfish 10J are washed as described above, they may be fed by the aforementioned separate conveyor to a checker to confirm the absence of foreign matter.

The interruption member 58A prevents the foreign matter and/or the rubbish matter removed from the foods 10 from being dropped onto the food wash area 14 of the food conveyor means 12.

It will be noted that water spray obtained by the water jet stream layers striking against and rebounding from the net-like conveyor members 20 and 22 also serves to wash the foods 10 together with the sheet-like water jet stream layers 26W and 26'W through 32W and 32'W.

Figure 7:
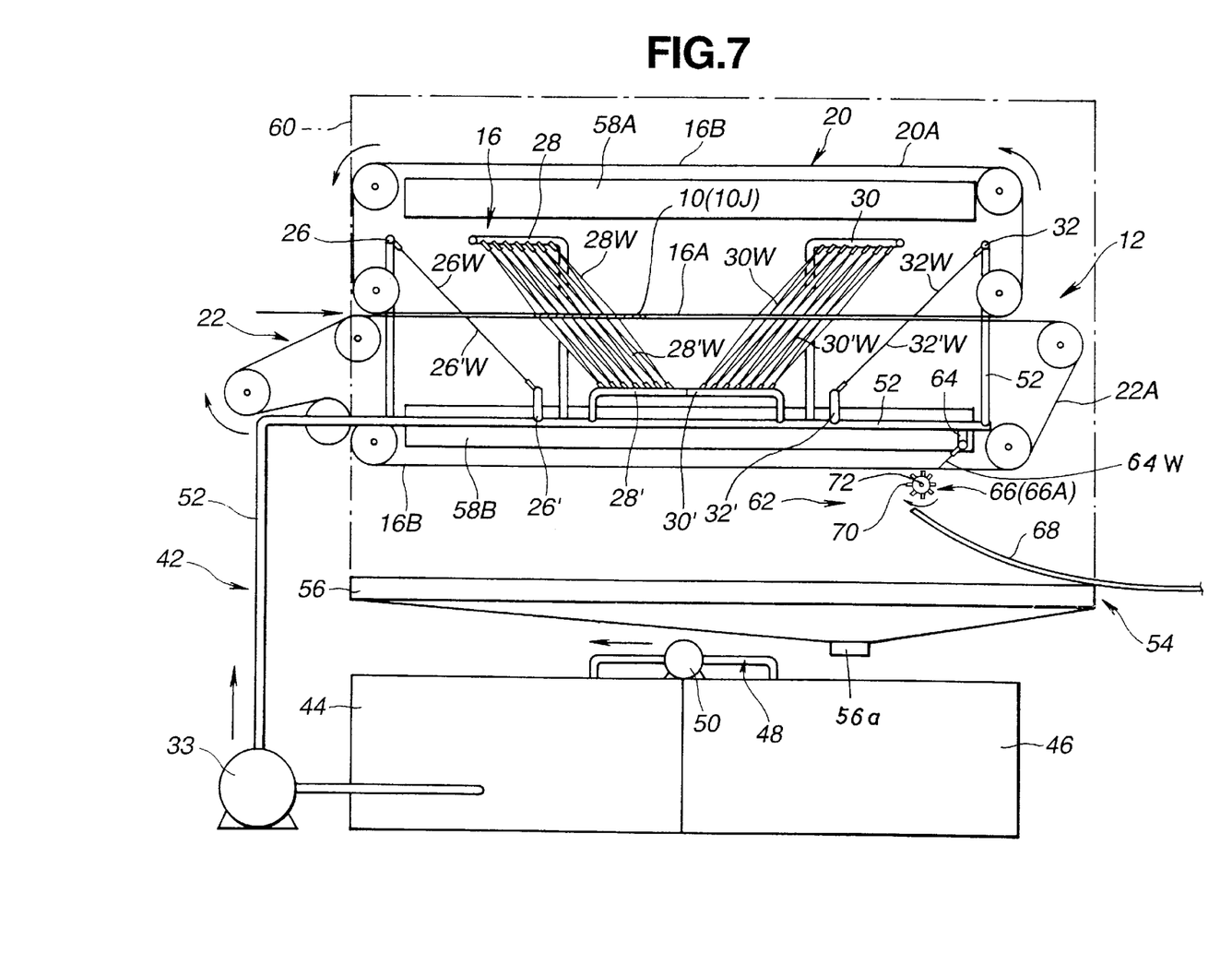
FIG. 7 is a side elevational view of an apparatus for washing foods that is substantially identical to that of FIGS. 1 through 3, except that the apparatus comprises a means to forcibly remove the foods from the food conveyor means.

A modification of the apparatus of FIGS. 1 and 2 is illustrated in FIG. 7. The modified apparatus is substantially identical to that of FIGS. 1 and 2, except that the modified apparatus further comprises a food removal means 62 to forcibly remove the washed foods 10 from the food conveyor means 12.

As shown in FIG. 7, the food removal means 62 may comprise a water jet generator 64 which may be similar to either of the water jet stream generators 26 and 26' through 32 and 321 and a removal member 66 which may be in the form of an impeller type or blade-like rotor 66A.

The water jet generator 64 may be connected to the water supply conduit 52. The water jet stream layer 64W may be directed to the jellyfish 10J on the return area 16B of the conveyor belt 22A on the outlet side thereof so as to be removed from the conveyor belt 22A and dropped onto the chute 68 which is disposed under the conveyor belt 22A.

The blade-like rotor 66A may comprise eight blades 70 securely mounted on a shaft 72. Each blade 70 may be formed of a plate of stainless steel or other material having a width 640 mm, a thickness of 3 mm and a length of 6 mm. The shaft 72 may have a diameter of 15 mm. The rotor 66A may be so disposed below the return area 16B of the conveyor belt 22A that each of the blades 70 enters the meshes of the conveyor belt 22A while the jellyfish 10J are forcibly removed from the net conveyor belt 22A.

The blade-like rotor 72 may be driven via a transmission from the same drive power source (not shown) that drives the food conveyor means 12.

Although edible jellyfish 10J are shown in FIGS. 1, 2 and 7 as the foods 10 to be washed, other foods may also be washed by the apparatus of the present invention; e.g. marine products other than jellyfish 10J such as fish and shellfish which may be shucked or covered with a shell. In particular, scales may be effectively removed from fish by the apparatus of FIGS. 1, 2 and 7.

Figure 8:
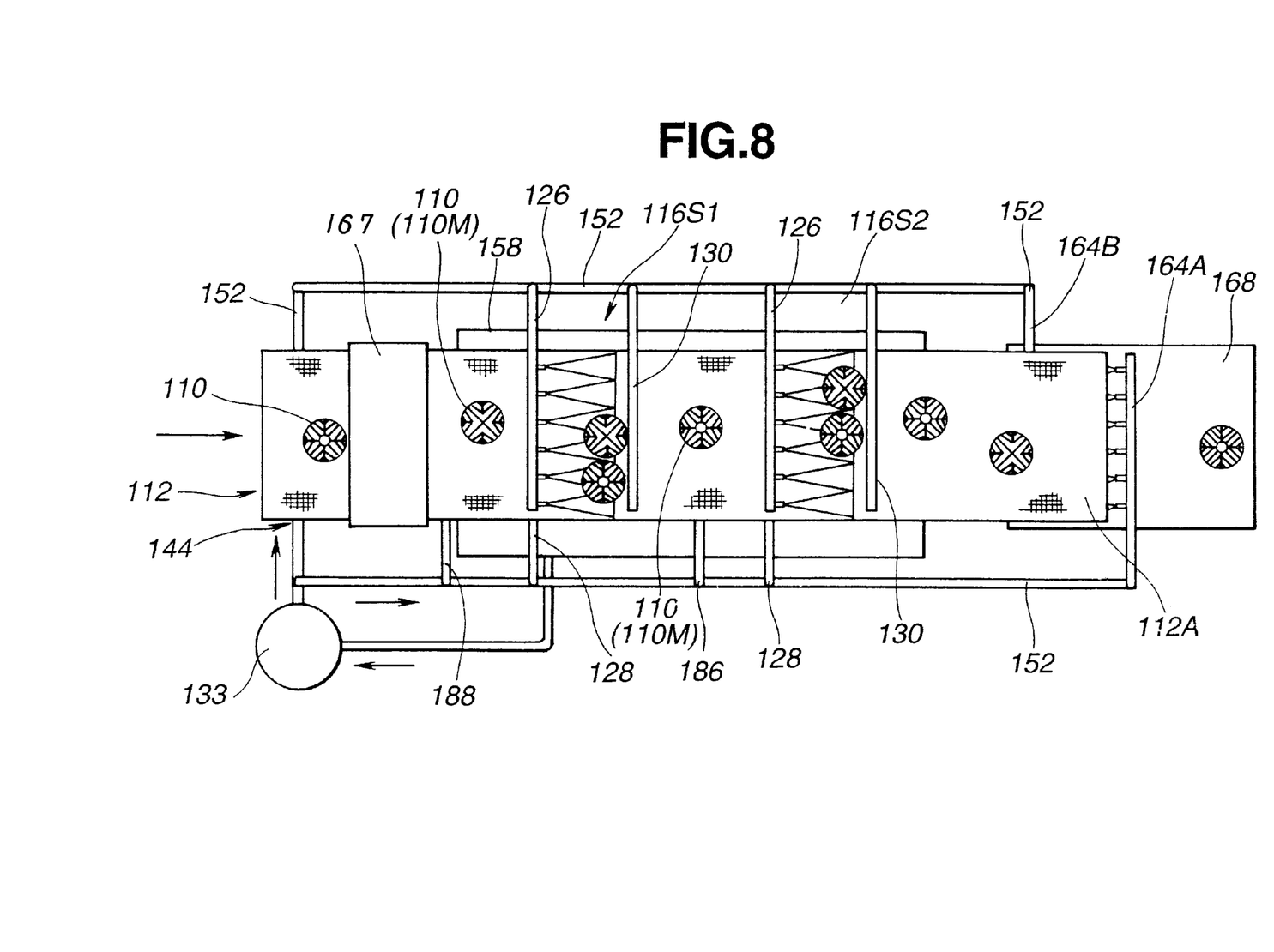
FIG. 8 is a plan view of an apparatus for washing foods in accordance with another embodiment of the present invention wherein vegetables or fruits are suitably washed.
Figure 9:
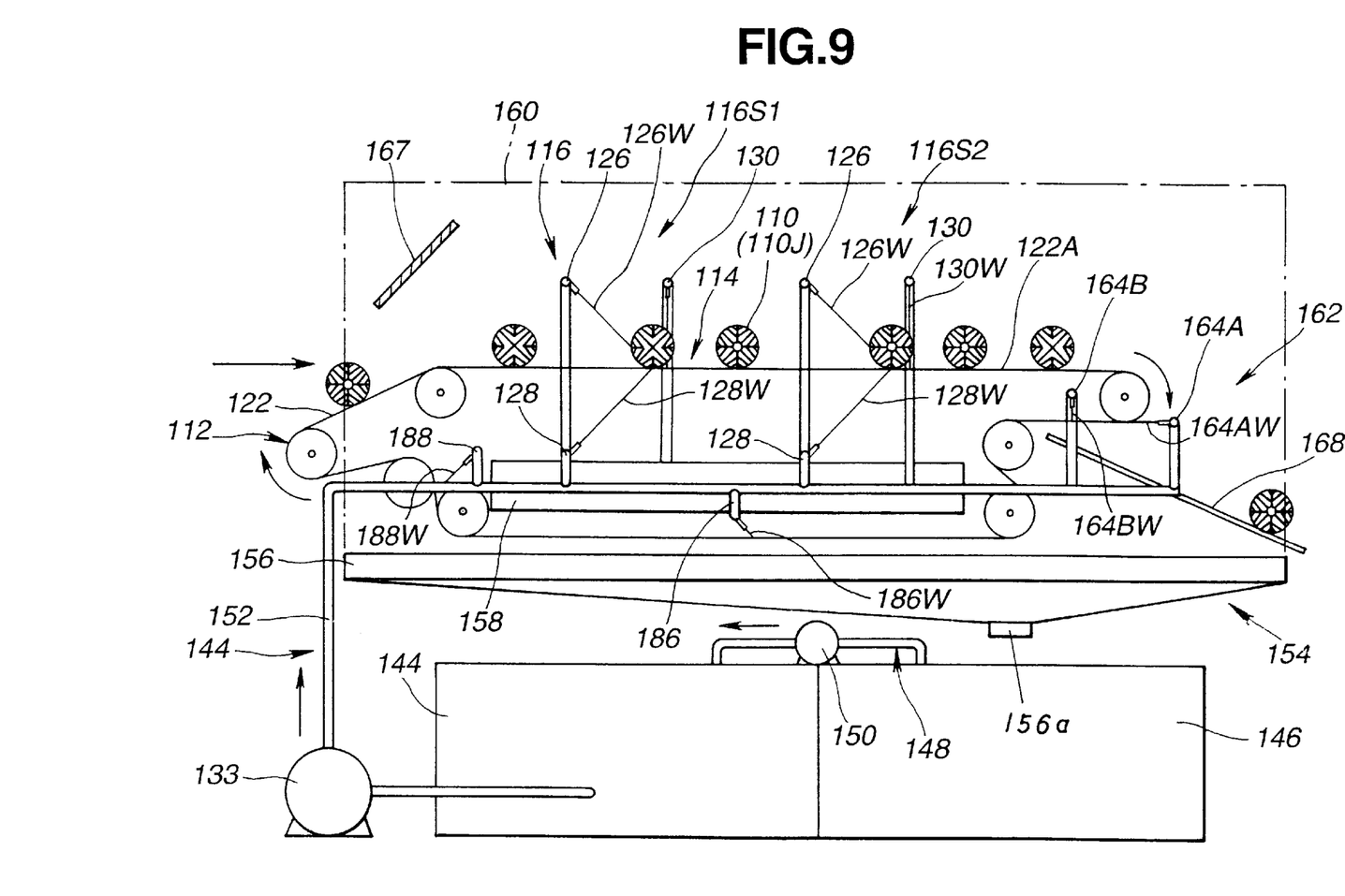
FIG. 9 is a side elevational view of the apparatus of FIG. 8.

Referring now to FIGS. 8 and 9, there is illustrated an apparatus for washing foods constructed in accordance with another embodiment of the invention wherein foods 110 such as vegetables or fruits are suitably washed. In FIGS. 8 and 9, the foods 110 are shown to be "mekabu," which is the root of a type of seaweed known as "wakame" in Japanese. The technical name for this species is *Undaria pinnatifida*. However, vegetables and fruits other than "mekabu" may be washed by the apparatus of FIGS. 8 and 9. The "mekabu" will hereinafter be referred to simply as seaweed 110M. Fresh water, but not salt water is preferably used for washing the foods 110.

The food washing apparatus of FIGS. 8 and 9 also comprises a food conveyor means 112 to convey the foods 110 through a food wash area 14, a water jet stream generator means 116 to generate a sheet-like water jet stream 118 and direct it to the food wash area 14 so that the sheet-like water jet stream 118 impinges against the foods 110, and a water circulation means 142 to circulate water from the water supply source to the water jet stream generator means 116. The water jet stream generator means 116 may spout fresh water suitable for washing the foods 110 such as "mekabu", vegetables or fruits, which is different from the salt water used in the apparatus of FIGS. 1 and 2.

Since the food conveyor means 112, the water jet stream generator means 116 and the water circulation means 142 are substantially identical to those of FIGS. 1 and 2, only their principal differences are described below. The same components are designated by reference numbers which are indicated by adding 100 to the corresponding reference numerals of FIGS. 1 and 2.

First, the food conveyor means 112 comprises only a lower conveyor member 122 which may be formed of a net-like conveyor belt 122A. The foods 110 such as "mekabu" are transferred to the conveyor belt 122A at its inlet and conveyed toward the food wash area 114.

The water jet stream generator means 116 may comprise two sets of generator means sections 116S1 and 116S2. Each of the generator means sections 116S1 and 116S2 may comprise three pairs of water jet stream generators 126, 128 and 130 to generate water jet stream layers 126W, 128W and 130W, respectively.

All of these water jet stream generators 126, 128 and 130 of FIGS. 8 and 9 are directed in a direction parallel to the conveying direction, which is different from those of FIGS. 1, 2 and 7. The water jet stream generators 126 and 130 may be disposed above the conveyor belt 122A while the water jet stream generator 128 may be disposed below the conveyor belt 122A. The water jet stream generators 126 and 128 may be disposed so as to generate the water jet stream layers 126W and 128W at an inclination angle θ relative to the conveying surface of the conveyor members 120 and 122 as if they cross each other while the water jet stream generator 130 may be disposed so as to generate the water jet stream layer 130W in a vertical manner relative to the conveying surface. The angle θ at which the water jet stream layers 126W and 128W are directed to the foods 110 relative to the conveying surface of the conveyor members 120 and 122 may preferably be different from each other, but may range from 30° to 60°.

Figures 10A, 10B, 10C:
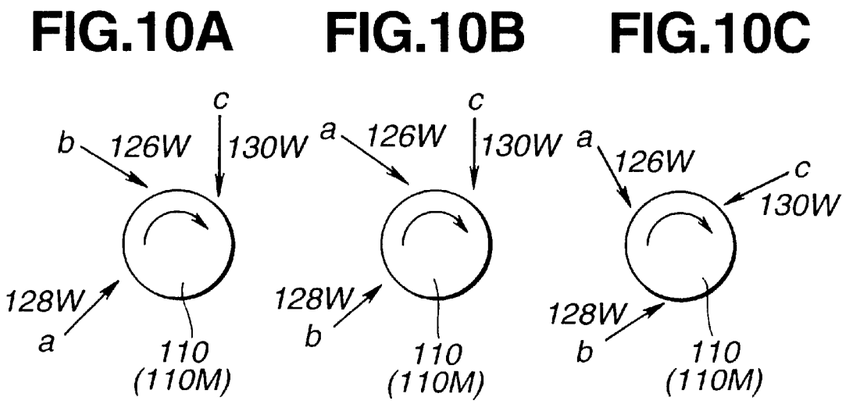
FIG. 10A illustrates an operation of the apparatus of FIGS. 8 and 9 in which the sheet-like water jet stream layers impinge against the foods in one mode.
FIG. 10B illustrates an operation of the apparatus of FIGS. 8 and 9 in which the sheet-like water jet stream layers impinge against the foods in a second mode.
FIG. 10C illustrates an operation of the apparatus of FIGS. 8 and 9 in which the sheet-like water jet stream layers impinge against the foods in a third mode.

Thus, in each of the generator means sections 116S1 and 116S2, three water jet stream layers 126W, 128W and 130W are generated and successively impinged against the specific food 10 at the various angles as illustrated in FIGS. 10A and 10B.

More particularly, in each of the generator sections 116S1 and 116S2, the sheet-like water jet stream layer 128W impinges the food 110 below the conveyor belt 122A in an upwardly inclined manner as indicated by arrow a of FIG. 10A, and the sheet-like water jet stream layer 126W impinges the food 110 above the conveyor belt 122A in a downwardly inclined manner as indicated by arrow b of FIG. 10A, and finally the sheet-like water jet stream layer 130W impinges the food 110 above the conveyor belt 122A in a vertical manner as indicated by arrow c of FIG. 10A.

Thus, the sheet-like water jet stream layers 128W, 126W and 130W successively impinge the food 110 so that the food is turned or rotated on the conveyor belt 122A as indicated by an arrow of FIG. 10A while it is slightly jumped above the conveyor belt 122A. This allows the food 110 to be washed all over the surfaces thereof while the foreign matter is removed therefrom by these water jet stream layers 128W, 126W and 130W. It should be noted that the vertical water jet stream layer 130W serves to prevent the food 110 from forcibly moving on the conveyor belt 122A due to the forwardly inclined water jet stream layers 126W and 128W. This enables the food 110 to positively contact the water jet stream layers 126W, 128W and 130W.

Since two generator means sections 116S1 and 116S2 successively work on the foods 110 as they are conveyed by the conveyor belt 122A, the foods 110 are more effectively washed while foreign matter is removed therefrom.

Alternatively, as shown in FIG. 10B, the sheet-like water jet stream layers 126W, 128W and 130W may be successively impinged against the foods 110 in order of the water jet stream layers 126W, 128W and 130W as indicated by arrows a, b and c in FIG. 10B. These successive sheet-like water jet stream layers 126W, 128W and 130W serve to wash the foods 110 in the same manner as illustrated in FIG. 10A.

Further alternatively, as shown in FIG. 10C, the sheet-like water jet stream layer 130W may be directed to the foods 110 not in a vertical manner, but in a reversely inclined manner. All the inclined sheet-like water jet stream layers 126W, 128W and 130W may be successively impinged against the foods 110 in order of the water jet stream layers 126W, 128W and 130W as indicated by arrows a, b and c in FIG. 10C. These successive sheet-like water jet stream layers 126W, 128W and 130W also serve to wash the foods 110 in the same manner as illustrated in FIGS. 10A and 10B. In this case, the reversely inclined water jet stream layer 130W of FIG. 10C may serve to prevent the foods 110 from forcibly moving on the conveyor belt 122A in the same manner as the vertically directed water jet stream layer 130W of FIGS. 10A and 10B.

The sheet-like water jet stream layers 126W, 128W and 130W of FIGS. 10A, 10B and 10C may be simultaneously impinged against the foods 110, which is different from those of FIGS. 10A through 10C.

The upper inclined water jet stream layer 126W together with the other water jet stream layers 128W and 130W serves to crumple the foods 110 while the lower inclined water jet stream layer 128W serves to raise the weighty foods 110 from the net-like conveyor belt 122A so as to ensure the foods 110 are not prevented from being rotated because the foods 110 are held between the meshes of the conveyor belt 112A.

The quantity and the pressure of the water jet stream layers 126W, 128W and 130W may be adjusted according to the type (hardness) and size of the foods 110 to be washed. The quantity and the pressure of the water jet stream layers should increase as the foods become harder.

A food removal means 162 serves to forcibly remove the washed foods 110 from the Nod conveyor means 112 at the outlet thereof.

As shown in FIG. 9, the food removal means 162 may comprise water jet generators 164A and 164B, which may be similar to either of the water jet stream generators 126 through 130, to generate sheet-like water jet stream layers 164AW and 164BW. The water jet stream layer 164AW may be directed to the first lower horizontal portion of the return area of the conveyor member 122 near the outlet thereof in a horizontal manner while the water jet stream layer 164BW may be downwardly directed to the first lower horizontal portion of the return area of the conveyor member 122 near the outlet thereof in a vertical manner. These water jet stream layers 164AW and 164BW serve to forcibly remove the washed foods 110 from the return area of the conveyor member 122 and deliver them onto the chute 168.

Two conveyor cleaning means 186 and 188 may be provided along the return area of the conveyor member 122 in a spaced manner. These conveyor cleaning means 186 and 188 may comprise a water jet generator, which may be similar to either of the water jet stream generators 126 through 130, to generate sheet-like water jet stream layers 186W and 188W respectively.

The sheet-like water jet stream layer 186W from the conveyor cleaning means 186 is directed to the second or middle lower horizontal portion of the return area of the conveyor member 122 to remove from the conveying member 122 the foreign matter which that has been removed from the foods 110 via washing by the sheet-like water jet stream layers 126W through 130W.

The sheet-like water jet stream layer 188W from the conveyor cleaning means 188 is directed to the lower curved portion of the return area of the conveyor member 122 near the inlet portion thereof to remove the remaining foreign matter therefrom.

The water jet generators 164A and 164B of the food removal means 162 and the water jet generators of the conveyor cleaning means 186 and 188 may be connected to the water supply conduit 152.

As shown in FIG. 9, a food feeding limit means 167, which may be in the form of plate member, may be provided at the inlet of the conveying member 122. The food feeding limit means 167 serves to limit the quantity of foods 110 to be mounted onto the conveyor member 122.

The operation of the apparatus of FIGS. 8 and 9 is substantially identical to that of FIGS. 1 and 2 or FIG. 7, except that the foods 110 are conveyed by only lower conveyor member 122 and rotated or turned by the various sheet-like water jet stream layers 126W, 128W and 130W of the respective jet generator means sections 116S1 and 116S2, except that the deflected water jet stream layers, which might be transversely scattered from the conveyor member 122, are not used for washing the foods 110.

Although "mekabu" is shown in FIGS. 8 and 9 as the food to be washed, the apparatus of FIGS. 8 and 9 may also be used to wash other foods such as farm products like vegetables including cabbages, Chinese cabbages or lettuces, as well as fruits like apples, oranges or berries for use in producing jam.

Although some preferred embodiments have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A food washing apparatus for washing foods comprising a food conveyor means including at least one conveyor member, through which water flows, to convey said foods through a food wash area, a water jet stream generator means including pump means for delivering a pressurized flow of water to a plurality of elongate nozzle openings, said nozzle openings being sized to emit associated sheet-like water jet stream layers directed in a plane into said food washing area and to impinge against said foods.

2. A food washing apparatus as set forth in claim 1, wherein at least a pair of opposed sheet-like water jet stream layers in a common plane are directed to a common one of said foods whereby said common one of said foods is prevented from being moved due to the imposed impingement of said pair of opposed sheet-like water jet stream layers.

3. A food washing apparatus as set forth in claim 1, wherein said plurality of sheet-like water jet stream layers are directed from various directions to a common one of said foods so as to turn said common one of said foods on said conveyor means, said sheet-like water jet stream layers including one directed to said common one of said foods at its leading end in a downward direction whereby said common one of said foods is prevented from forwardly moving on said conveyor due to impingement of said sheet-like water jet stream layers.

4. A food washing apparatus as set forth in claim 1, wherein said plurality of sheet-like water jet stream layers are directed from various directions to a common one of said foods whereby said common one of said foods is turned on said conveyor means, a said sheet-like water jet stream layers including one directed to said common one of said foods at its leading end in a downward direction and opposite to a conveying direction of said conveyor means whereby said common one of said foods is prevented from forwardly moving on said conveyor due to impingement of said sheet-like water jet stream layers.

5. A food washing apparatus as set forth in claim 1, wherein said plurality of sheet-like water jet stream layers are directed to a common one of said foods from various directions relative to a conveying direction of said food conveyor whereby said common one of said foods is turned by said plurality of sheet-like water jet stream layers on said conveyor means due to impingement of said sheet-like water jet stream layers.

6. A food washing apparatus as set forth in claim 5, wherein said directions from which said plurality of sheet-like water jet stream layers are directed are not parallel relative to said conveying direction of said conveyor means.

7. A food washing apparatus as set forth in claim 1, wherein pairs of opposed sheet-like water jet stream layers are directed to a common one of said foods at a predetermined angle relative to a conveying surface of said food conveyor means and from various directions relative to a conveying direction of said food conveyor means whereby said common one of said foods is washed from various directions while it is prevented from being moved on said conveyor means due to the impingement of said sheet-like water jet stream layers.

8. A food washing apparatus as set forth in claim 1, further comprising a water circulation means to circulate water through said sheet-like water jet stream generator means while said water is filtered after washing said foods, said water circulation means comprising a water supply tank to supply water to said water jet stream generator means, a water receipt tank to receive water after washing said foods and a return passage including a water pump to feed water from said water receipt tank to said water supply tank and a filter to filter said water, and a water collector means to collect water after washing said foods and introduce water into said water receipt tank, said water collector means including an interruption member disposed between a conveying area and a return area of said food conveyor means whereby foreign matter removed from said foods on said food conveyor means is introduced into said water receipt tank without being attached to said return area of said food conveyor means.

9. A food washing apparatus as set forth in claim 1, further comprising a food removal means to forcibly remove said foods from said food conveyor means following conveyance of said foods through said food washing area, said food removal means comprising a sheet-like water jet stream generator.

* * * * *